United States Patent
Shanmugam et al.

(10) Patent No.: US 10,990,755 B2
(45) Date of Patent: *Apr. 27, 2021

(54) ALTERING TEXT OF AN IMAGE IN AUGMENTED OR VIRTUAL REALITY

(71) Applicant: International Business Machines Corporation, Armonk, NY (US)

(72) Inventors: Dhandapani Shanmugam, Bangalore (IN); Manjunatha D., Bangalore (IN); Yethish G. Venkataramanachari, Robertsonpet (IN); Siddique M. Adoni, Bangalore (IN); Suman Mitra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/850,451

(22) Filed: Dec. 21, 2017

(65) Prior Publication Data

US 2019/0197098 A1 Jun. 27, 2019

(51) Int. Cl.
*G06F 40/232* (2020.01)
*G06F 3/16* (2006.01)
(Continued)

(52) U.S. Cl.
CPC ............ *G06F 40/232* (2020.01); *G06F 3/16* (2013.01); *G06T 11/60* (2013.01); *H04N 7/183* (2013.01); *G06F 3/011* (2013.01)

(58) Field of Classification Search
CPC .............................. G06F 17/24; G06F 17/211
See application file for complete search history.

(56) References Cited

U.S. PATENT DOCUMENTS 4,889,422 A * 12/1989 Pavlidis ................. G16H 15/00
                                                              351/210
6,154,757 A * 11/2000 Krause ................... G06F 40/166
                                                              715/205
(Continued)

OTHER PUBLICATIONS

Luz Rello; Maria et al. "DysWebxia A Text Accessibility Model for People with Dyslexia" PhD Thesis—Jun. 2014, 474 pages; https://www.researchgate.net/publication/254007333_DysWebxia_a_model_to_improve_accessibility_of_the_textual_web_for_dyslexic_users (Year: 2014).*

(Continued)

*Primary Examiner* — Scott T Baderman
*Assistant Examiner* — Benjamin Smith
(74) *Attorney, Agent, or Firm* — Heslin Rothenberg Farley & Mesiti P.C.; Scott Dobson, Esq.

(57) ABSTRACT

A method, computer program product, and visual display apparatus include a processor(s) obtaining data indicating that a user wearing the apparatus (which included an image capture device, and a projection device, communicatively coupled to the processor(s)), perceives displayed text with consistent character differences. The processor(s) obtains, from the image capture device, an image of a visual display within a visual range of the image capture device; the image includes textual elements. Based on the data, the processor(s) transforms the image into the new image that includes the textual elements with pre-defined character substitutions, based on the consistent character differences. The processor(s) displays, via the projection device, the new image, to the user, wherein based on viewing the new image, the user views the textual elements without the consistent character differences.

10 Claims, 9 Drawing Sheets

(51) Int. Cl.
*G06F 3/01* (2006.01)
*H04N 7/18* (2006.01)
*G06T 11/60* (2006.01)

(56) References Cited

U.S. PATENT DOCUMENTS

| | | | | |
|---|---|---|---|---|
| 8,386,234 B2* | 2/2013 | Uchimoto | ............... | G06F 40/47 704/4 |
| 8,761,513 B1* | 6/2014 | Rogowski | ............. | G09G 5/246 382/181 |
| 8,924,327 B2* | 12/2014 | Bazanov | ............. | G06Q 10/103 706/45 |
| 9,092,674 B2* | 7/2015 | Andrade | ................ | G06F 40/58 |
| 10,074,381 B1* | 9/2018 | Cowburn | ................ | G10L 21/10 |
| 10,362,284 B2* | 7/2019 | Thompson | ........... | H04N 13/373 |
| 10,404,974 B2* | 9/2019 | Dietz | ..................... | H04S 7/302 |
| 10,417,349 B2* | 9/2019 | Lewis | ..................... | G06F 40/58 |
| 10,427,045 B2* | 10/2019 | Thompson | ................ | A63F 13/27 |
| 10,580,213 B2* | 3/2020 | Browy | ............... | G06K 9/00671 |
| 10,613,699 B2* | 4/2020 | Thompson | .............. | G06F 3/011 |
| 10,769,858 B2* | 9/2020 | Browy | ............... | G02B 27/0172 |
| 2002/0119429 A1* | 8/2002 | Barton | ................ | G09B 17/003 434/178 |
| 2004/0191731 A1* | 9/2004 | Stork | ................ | G09B 21/001 434/180 |
| 2005/0257146 A1* | 11/2005 | Ashcraft | ................ | G06F 17/273 715/257 |
| 2007/0129935 A1* | 6/2007 | Uchimoto | ............... | G06F 40/47 704/9 |
| 2009/0138791 A1* | 5/2009 | Kamada | ................ | G06F 16/337 715/230 |
| 2011/0090253 A1* | 4/2011 | Good | ................ | G06K 9/00671 345/633 |
| 2011/0111377 A1 | 5/2011 | Dekkers | | |
| 2011/0229862 A1 | 9/2011 | Parikh | | |
| 2012/0120103 A1* | 5/2012 | Border | ................ | G02B 27/017 345/633 |
| 2012/0330646 A1* | 12/2012 | Andrade | ............. | G06K 9/3258 704/7 |
| 2013/0188887 A1* | 7/2013 | Chan | ........................ | G06K 9/20 382/312 |
| 2013/0281209 A1* | 10/2013 | Lyons | ..................... | A63F 13/53 463/33 |
| 2013/0293577 A1* | 11/2013 | Perez | ..................... | G06F 1/163 345/633 |
| 2014/0006326 A1* | 1/2014 | Bazanov | .................. | G09B 7/00 706/46 |
| 2014/0129207 A1* | 5/2014 | Bailey | .................... | G06F 40/58 704/2 |
| 2014/0223462 A1 | 8/2014 | Aimone et al. | | |
| 2014/0297256 A1* | 10/2014 | Rogowski | .......... | G06K 9/00463 704/2 |
| 2014/0302915 A1* | 10/2014 | Lyons | ................. | G07F 17/3237 463/25 |
| 2015/0126279 A1* | 5/2015 | Lyons | ................... | G07F 17/323 463/33 |
| 2015/0220503 A1* | 8/2015 | Landau | ................ | G06F 17/211 715/256 |
| 2015/0286621 A1* | 10/2015 | Henery | ................ | G06F 40/109 715/256 |
| 2016/0210100 A1* | 7/2016 | Ng | ...................... | G06K 9/00362 |
| 2016/0224122 A1* | 8/2016 | Dietz | ..................... | G06F 3/147 |
| 2016/0261837 A1* | 9/2016 | Thompson | .......... | H04N 9/3185 |
| 2016/0261856 A1* | 9/2016 | Ng | ......................... | H04N 13/398 |
| 2016/0357732 A1* | 12/2016 | Hsu | ...................... | G06F 16/2455 |
| 2016/0364087 A1* | 12/2016 | Thompson | ........... | H04N 13/351 |
| 2017/0091174 A1* | 3/2017 | Rubin | ..................... | G06F 3/041 |
| 2017/0127055 A1 | 5/2017 | Khabiri et al. | | |
| 2017/0200296 A1* | 7/2017 | Jones | ..................... | G06T 11/60 |
| 2017/0206691 A1* | 7/2017 | Harrises | ................. | G06T 11/60 |
| 2017/0308654 A1* | 10/2017 | Luz Rello-Sanchez | ..................... | G06N 5/04 |
| 2017/0365101 A1* | 12/2017 | Samec | ................ | G02B 27/017 |
| 2018/0033329 A1* | 2/2018 | Suleiman | ............... | G09B 17/04 |
| 2018/0075659 A1* | 3/2018 | Browy | .................... | G06F 3/013 |
| 2018/0113593 A1* | 4/2018 | Ng | ........................ | H04N 13/257 |
| 2018/0365232 A1* | 12/2018 | Lewis | ..................... | G06F 40/58 |
| 2019/0015747 A1* | 1/2019 | Thompson | ............... | G09G 5/00 |
| 2019/0028696 A1* | 1/2019 | Dietz | ................... | H04N 13/327 |
| 2019/0138113 A1* | 5/2019 | D | ........................ | G06F 3/04895 |
| 2019/0304406 A1* | 10/2019 | Griswold | ................ | G06F 3/011 |
| 2020/0193714 A1* | 6/2020 | Browy | .................... | G06T 19/006 |

OTHER PUBLICATIONS

Elisa Pedroli et al.; "A Psychometric Tool for a Virtual Reality Rehabilitation Approach for Dyslexia"; Computational and Mathematical Methods in Medicine vol. 2017, Article ID 7048676, 6 pages; https://doi.org/10.1155/2017/7048676 (Year: 2017).*

Nor Azlina Ab Aziz et al., Providing Augmented Reality Based Education for Students with Attention Deficit Hyperactive Disorder via Cloud Computing: Its Advantages; Feb. 19-22, 2012 ICACT2012, ISBN 978-89-5519-163-9, 5 pages (Year: 2012).*

List of IBM Patents or Patent Applications Treated as Related, Jul. 30, 2019, 2 pages.

Mell et al., "The NIST Definition of Cloud Computing", National Institute of Standards and Technology, U.S. Dept. of Commerce, NIST Special Publ. 800-145, Sep. 2011, 7 pages.

* cited by examiner

ALTERING TEXT OF AN IMAGE IN AUGMENTED OR VIRTUAL REALITY

BACKGROUND

Various issues can result in a situation where an individual is unable to read displayed text correctly. For example, experiencing challenges such as dyslexia and dysgraphia, may prevent individuals from recognizing written characters and words, as they would appear in the absence of these challenges.

SUMMARY

Shortcomings of the prior art are overcome and additional advantages are provided through the provision of a method for displaying a visually transformed image. The method includes, for instance: obtaining, by one or more processors, data indicating that a user of a visual display apparatus comprising an image capture device, and a projection device, communicatively coupled to the one or more processors, perceives displayed text with consistent character differences; obtaining, by one or more processors, from the image capture device, an image of the visual display within a visual range of the image capture device wherein the image comprises textual elements; based on the data, processing, by the one or more processors, the image to generate a new image, wherein the processing comprises transforming the image into the new image wherein the new image comprises the textual elements with pre-defined character substitutions based on the consistent character differences; and displaying, by the one or more processors, via the projection device, the new image, to the user, wherein based on viewing the new image, the user views the textual elements without the consistent character differences.

Shortcomings of the prior art are overcome and additional advantages are provided through the provision of a computer program product for displaying a visually transformed image. The computer program product comprises a storage medium readable by a processing circuit and storing instructions for execution by the processing circuit for performing a method. The method includes, for instance: obtaining, by the one or more processors, data indicating that a user of a visual display apparatus comprising an image capture device, and a projection device, communicatively coupled to the one or more processors, perceives displayed text with consistent character differences; obtaining, by one or more processors, from the image capture device, an image of the visual display within a visual range of the image capture device wherein the image comprises textual elements; based on the data, processing, by the one or more processors, the image to generate a new image, wherein the processing comprises transforming the image into the new image wherein the new image comprises the textual elements with pre-defined character substitutions based on the consistent character differences; and displaying, by the one or more processors, via the projection device, the new image, to the user, wherein based on viewing the new image, the user views the textual elements without the consistent character differences.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
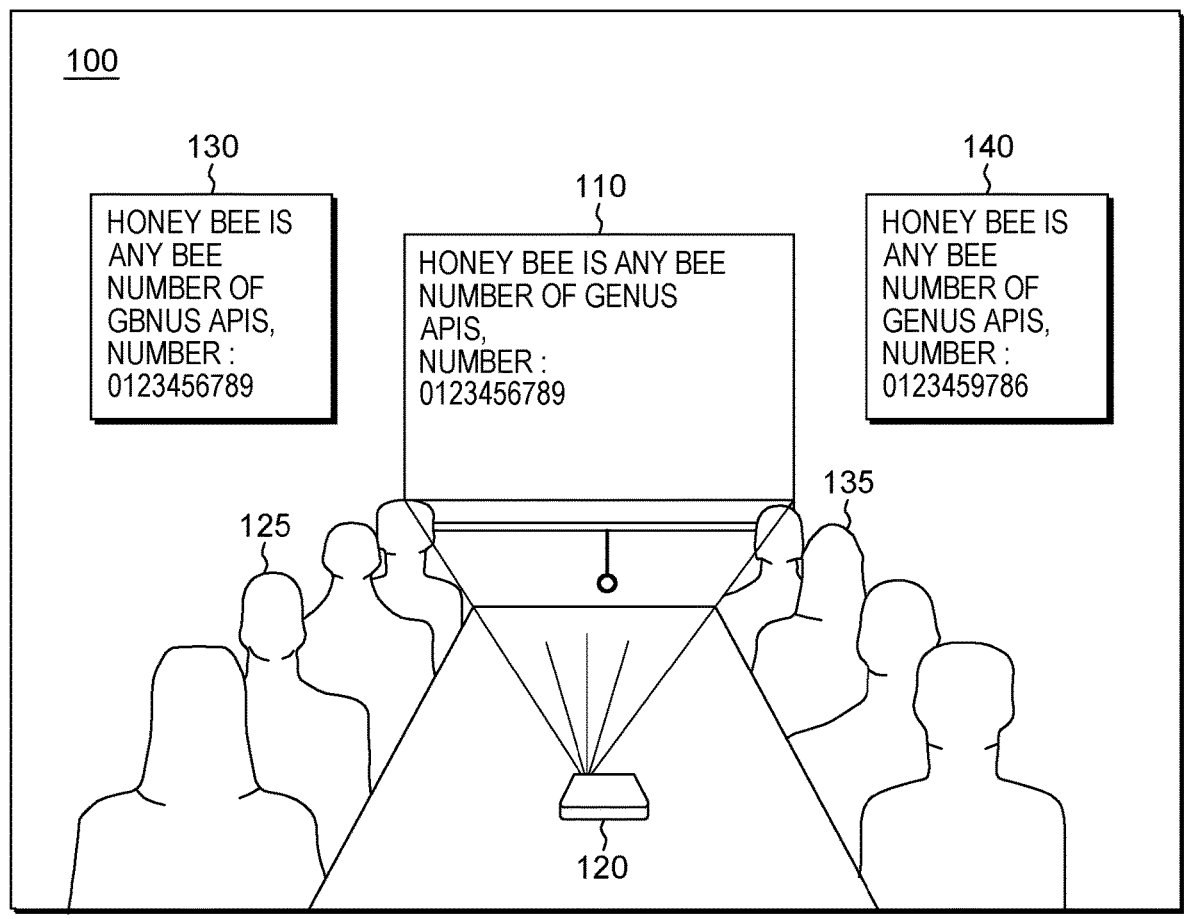
FIG. 1 is an illustration of various aspects of an environment in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
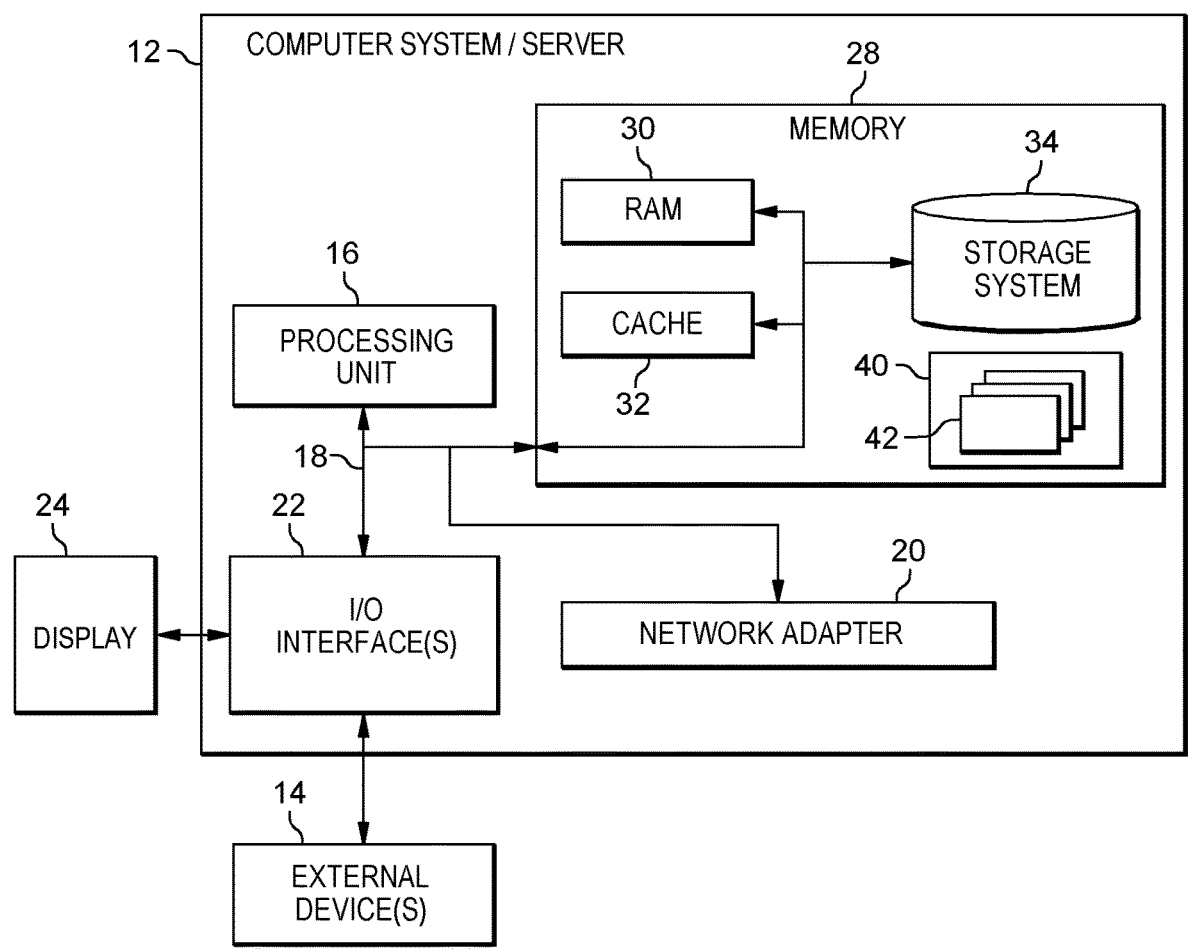
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Embodiments of the present invention include a computer-implemented method, a computer program product, and a visual display device that: 1) obtain data indicating that a user perceives displayed text with at least one character altered from the original text; 2) obtain textual elements (e.g., an image) of a visual display; 3) process the textual elements (e.g., by processing the image) to transform the content into new content where the new content include pre-defined character substitutions based on the at least one character altered from the original text; and 3) displaying the new content so that when the user view the new content, the at least one character altered from the original text is omitted from the new visual.

In many oral presentations given in professional, educational, and recreational environments, the presenter relies upon visuals to assist in presenting the content in a comprehensive fashion. Often, the presenter may utilize a projector coupled to a computing device or a large monitor coupled to the device to project and share portions of the content with attendees. Visual aids can be helpful in comprehensively presenting the content of the presentation and can illustrate concepts discussed as well as add additional information. For example, a presenter may display a slide with granular content on a given subject, while providing a quick overview, verbally. Thus, an individual attending the presentation, who is unable to correctly read the text displayed, will miss out on the content (and arguably the full impact) of the presentation. Certain individuals may experience cognitive issues perceiving the displayed content because they do not perceive the content, and specifically, the characters and words, in the same manner as an individual who is not experiencing the cognitive issue. One common issue in perceiving text, as written, is developmental dyslexia, which is an issue that can cause an individual experiencing the issue to perceive words and letters in orders and configurations that do not appear in the text. Developmental dyslexia is often associated with various conditions, including but not limited to, dysgraphia, attention deficit hyperactivity disorder, auditory processing disorder, developmental coordination disorder, various developmental issues, and various sensory perception issues, including autism spectrum disorders.

The particulars of the manner in which a display of characters appears differently to an individual experiencing a cognitive issue can be determined, based on the issue experienced. An individual who perceives words and characters differently will consistently perceive the words and characters in a consistent, though altered from the original text, manner. For example, in all visual displays, a given individual may perceive the letter "d" as the letter "b" and/or an individual may perceive the letter "W" as the letter "M." Because the issues experienced by a given individual follow a discoverable pattern, once a pattern is known, displayed text could be altered in order to generate a visual representation of the text that will be cognitively perceived by the individual in the manner intended by the author of the text.

FIG. 1 demonstrates the consistency in the manner in which certain individuals may perceive displayed content, as illustrated in FIG. 1, the textual elements which are substantive content of the displayed content in a manner that differs from the data comprising the actual display. FIG. 1 depicts a presentation 100 where certain of the attendees may perceive the content of a visual display 110, projected by a projector 120, with certain, consistent, alterations. A first individual 125 among the individuals viewing the presentation, views the visual display 110 in a manner characterized as a first altered display 130. The first altered display 130 demonstrates that the first individual 125 visualizes the letter "E" when it appears in the visual display 110 as the letter "B" and vice versa. Meanwhile, a second individual 135 views the visual display 110 in a manner characterized as the second altered display 140. As depicted in FIG. 1, the second altered display 140 demonstrates that the second individual visualizes the number "9" as the number "6" and vice versa. Thus, the perception of the visual display 110 by each individual corresponds to a particular visual transformation of characters. The visual transformation of the content, for each individual, will be consistent across any visual display 110.

Embodiments of the present invention include a computer-implemented method, a computer program product, and a system where one or more programs executed on one or more processing circuit obtain displayed data, transform the content of the visual display in real-time (or close to real-time), and re-display the data to the user such that the user will perceive the intended content of the display, rather than the content, as visually impacted by cognitive issues that the user may or may not be experiencing. As described in greater detail herein, embodiments of the present invention may include one or more of the following aspects, which represent advantages over existing reading assistance technologies in presentation settings: 1) a computing device (e.g., a personal computing device, a wearable apparatus, a pen computer, a smart device, an Internet of Things device, etc.) that automatically transforms displayed content to redisplay with modifications; 2) voice-activated visual transformation controls; 3) network communication capabilities utilized to control visual transformation; 4) rapid image processing by the computing device; and/or 5) virtual projection by the computing device of a resultant image of the visual transformation; 6) any visual manipulation of an original display can be experienced by a user of an embodiment of the present invention without altering the display itself or interfering with the visual experience of other individuals viewing the display. The enumerated aspects are discussed below.

First, some embodiments of the present invention include a computing device that automatically transforms displayed content and redisplays at least a portion of the content, with modifications. The apparatus is an optical display, which an individual can wear on his or her person (e.g., his or her head). This apparatus transforms displayed text, which the user does not perceive correctly, into content, in a format that the user can read and comprehend. By wearing the optical display, the user is able to automatically obtain content that was previously, arguably, incomprehensible (or difficult to comprehend). The optical display portion of embodiments of the present invention may comprise the program code that automatically visually transforms displayed text in a dynamic manner, such that different visual perception issues can be accommodated. Other embodiments of the present information may house the visual transformation code on a computing node that is accessible to the computing device.

Second, some embodiments of the present invention include voice-activated visual transformation controls. In these embodiments, a user may take advantage of the dynamic nature of visual correction by making vocal commands, which are received by one or more programs, and utilized to adjust, dynamically, the visual transformation functionality of the embodiment, to accommodate the specific visual perception issues indicated by the user in the vocal command. For example, the user may verbally indicate a pre-defined character error classification, which can include one or more of a vertical transformation of displayed characters, a horizontal transformation of displayed characters, and/or a visual similarity of displayed characters. Based on receiving a vocal command from the user indicating the pre-defined classification, the one or more programs may automatically adjust the visual transformations performed by the one or more programs to address the specific issues experienced by this user. Although vocal commands can be utilized in embodiments of the present invention, as will be discussed later, embodiments of the present invention may include one or more programs that determine an identity (and then, a perceived cognitive issue, experienced by a user) through various other methods, including but not limited to using facial or other recognition techniques, based on the user account or name logged into a computer system coupled to or internal, to the device, or in any other manner.

Third, in addition to potentially adjusting visual display correction based on vocal commands, the computing device, in embodiments of the present invention, may include network communication capabilities, enabling one or more programs in an embodiment of the present invention to obtain information regarding the specific visual perception issues of a wearer of the apparatus, from another source. For example, based on completing a computerized test, one or more programs executing on the computing device upon which the test was administered may determine that the user's visual perceptions issues fit a pre-defined classification. One or more programs in the computing device may obtain the pre-defined classification of the user from the computing device, over a network connection, including the Internet. Based on the pre-defined classification, the one or more programs adjust the types of visual transformations performed by the apparatus.

Fourth, in some embodiments of the present invention, one or more programs either within the computing device or accessible to the program code of the computing device obtain images of a display and rapidly process the image to transform it into an image that includes corrections that address the visual perception issues of the wearer. For example, for a user who perceives the letter "E" as the letter "B" and vice versa, the one or more programs manipulates the image of a display that contains these letters and switches the location of these letters in an image generated for the user.

Fifth, in some embodiments of the present invention, the one or more programs project a resultant image, generated based on an original display. The resultant image includes in it the visual changes implemented in order to enable an individual with a visual perception issue to perceive a display in accordance with how the creator of the display intended it to be perceived. For example, in FIG. 1, the first individual 125, and the second individual 135, rather than perceiving the visual display 110 content as depicted in the first altered display 130 and the second altered display 130, would view the content, based on the projection, as it appears in the visual display 110.

Figure 2:
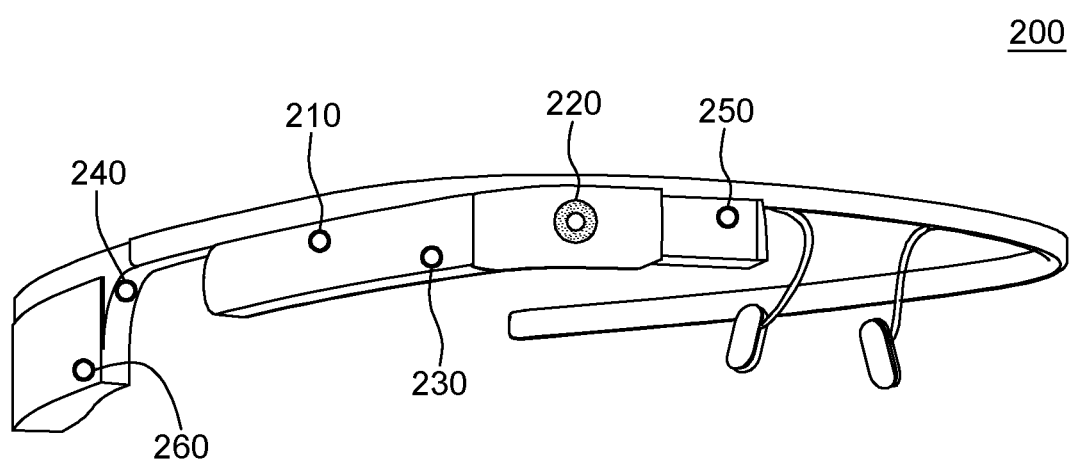
FIG. 2 is an illustration of various aspects of some embodiments of the present invention.

FIG. 2 illustrates an example of a wearable apparatus 200 that comprises an aspect of some embodiments of the present invention. As explained above, a computing device utilized in embodiments of the present invention may include a wearable device. The apparatus 200 of FIG. 2, which is just one example of a computing device that may comprise one or more aspects of some embodiments of the present invention, is an optical head mounted display (OHMD). As will be discussed in greater detail, the OHMD apparatus 200 in some embodiments of the present invention includes a camera 220, a processing unit 210 for image processing, a projector, such as a prism 250, and a microphone 230. The configuration of elements in the apparatus 200 are merely one example of possible configurations (and elements) that may be utilized to achieve the described functionality in embodiments of the present invention. This example is offered for illustrative purposes only.

As understood by one of skill in the art, other computing devices, for example, those that are neither wearable not head-mounted, may be utilized in embodiments of the present invention, in place of or together with the OHMD apparatus 200. As will be discussed later, in some embodiments of the present invention, the device that projects corrected text may include a computing device, such as a pen computer and any Internet of Things device (e.g., a smart device).

As will explained utilizing an OHMD apparatus 200 as an example, computing devices utilized in embodiments of the present invention may include devices capable of receiving input regarding: 1) the specific cognitive issues of a user; and 2) visual displays being viewed by the user and based on these inputs. Based on this input, these devices are capable of projecting and/or otherwise displaying a version of the textual content of the visual displays in a manner that enables the user to experience this content without the cognitive issues influencing the user's perception of the content.

Returning to FIG. 2, in an embodiment of the present invention, the wearable apparatus 200, for example, one or more processors embodied in the wearable apparatus 200, as a central processing unit (CPU) 210, obtain information regarding the cognitive issues experienced by the wearer, that result in the wearer perceiving displayed text in an altered manner, when compared to the original content (displayed content). As understood by one of skill in the art, various cognitive issues can fit known patterns and thus, a specific impairment can be assigned a "level" and that level refers to one or more specific cognitive issues. For example, a user with a cognitive issue categorized as a given level (e.g., "level 1") may view certain characters reversed vertically (e.g., a "6" as a "9", and vice versa, and an "M" as a "W" and vice versa). Thus, one or more processors (e.g., CPU 210) in the apparatus 200 (or accessible to the apparatus 200) may receive data describing a cognitive challenge of a wearer as a level and the one or more processors may interpret this level to refer to a specific cognitive issue, requiring specific adjustments in order to display text to this wearer, such that the text appears to the wearer unaltered by the cognitive issue experienced by the wearer. One or more programs executing on the apparatus may receive information regarding the cognitive challenges of a wearer over a communications connection, from a computing node communicatively connected to the apparatus, for example, over a wireless connection, such as the Internet.

In some embodiments of the present invention, the one or more programs executing on a processor in the apparatus 200 receive data regarding the cognitive issues of the wearer from a vocal command. The apparatus 200 includes speakers 240, which may prompt the wearer to can give this command, which the one or more programs may receive and interpret, in order to adjust displayed text in a manner that will accommodate the wearer. For example, after a prompt from the speakers 240, the wearer may speak an identifier, such as a level identifier, into a microphone 230 in the apparatus 200. Program code executed by the CPU 210 receives and interprets the vocal command obtained via the microphone 230. In some embodiments of the present invention, the one or more programs may utilize an alternative recognition method (technology or technique) to identify the user and determine, based on the identity of the user, the cognitive issues experienced by the user. For example, embodiments of the present invention may include facial or other physical recognition techniques (e.g., fingerprint), that determine the identity of a user based on a physical feature. One or more programs in some embodiments of the present invention may determine the identity of a user based on accessing user information from interactions of the user with the apparatus or with an input device communicatively couples to the apparatus. For example, in some embodiments of the present invention, the one or more programs may identify a user based on a user account or name on a computer system communicating with and/or internal to, the apparatus.

In some embodiments of the present invention, the apparatus 200 also includes a camera 220, which may include functionality for both video and still images. The camera 220 captures original images (and video) that includes text and provides this content to one or more programs executed by the CPU 210, which can process the captured images. The one or more programs process the images by identifying text (e.g., characters), that the wearer will perceive differently than displayed, based on the cognitive issues previously provided to the program code. The one or more programs alter the images (e.g., by creating an overlay of certain portions of the image) such that when projected by the apparatus 200, for example, utilizing the prism 250, the wearer of the apparatus 200 will view the original content of the text, while wearing the apparatus 200, rather than the altered content she or he would view without wearing the apparatus 200. In some embodiments of the present invention, the program code utilizes the prism 250 in the apparatus 200 to overlay specific changes to the original images that enable the wearer to experience the original content (text) included in these images. The program code determines the changes to include in the overlay based on the cognitive issues of the wearer.

Figure 3:
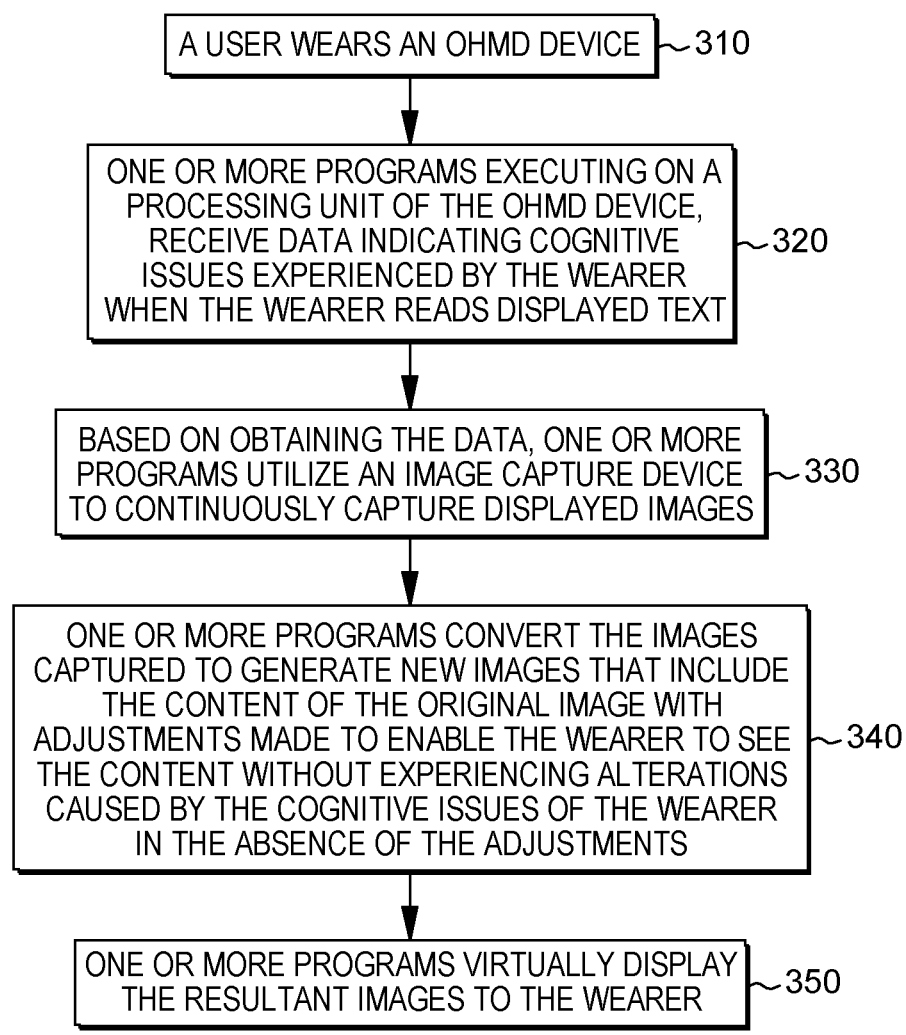
FIG. 3 is a workflow illustrating certain aspects of an embodiment of the present invention.

FIG. 3 is a workflow 300 that depicts the utilization of the apparatus 200 of FIG. 2 by a wearer, in accordance with certain aspects of an embodiment of the present invention. In an embodiment of the present invention, a user will wear the OHMD device (e.g., FIG. 2, apparatus 200) (310). One or more programs executing on a processing unit of the OHMD device (e.g., FIG. 2, CPU 210), receive data indicating cognitive issues experienced by the wearer when the wearer reads displayed text (320). In an embodiment of the present invention, the user may provide the apparatus 200 (FIG. 2) with this information via a voice command. The user may indicate the issue by identifying a cognitive issues utilizing a pre-defined level identifier. For example, when the program code of the apparatus 200 (FIG. 2) receives a vocal command of "Level 1", the one or more programs may determine that this command indicates that the wearer perceives the character "E" as "B" and vice versa. In some embodiments of the present invention, rather than receive information related to cognitive issues of the user via a stored personal profile on a memory that is part of the device and/or accessible to the program code executing on the CPU 210 (FIG. 2) of the device. For example, the apparatus 200 (FIG. 2) may be capable of communicating over Bluetooth and/or other wireless communication standards to retrieve information related to the user and the cognitive issues that are relevant to the user. In some embodiments of the present invention, one or more programs may query an accessible data source (such as a computing node of a distributed network) in order to obtain information related cognitive issues experienced by a given user. The user may supply identifying information that will enable the one or more programs to make this query.

In an embodiment of the present invention, based on obtaining the data indicating cognitive issues experienced by the wearer when the wearer reads displayed text, one or more programs executing on a processing unit (e.g., FIG. 2, CPU 210) of the OHMD device (e.g., FIG. 2, apparatus 200) utilize an image capture device (e.g., FIG. 2, camera 220) to continuously capture (e.g., in real-time) displayed images (330). Based on the data indicating cognitive issues experienced by the wearer, the one or more programs convert the images captured such that the resultant images include the content of the original image (e.g., the text in the original images) with adjustments made to enable the wearer to see the images without the cognitive issues of the wearer influencing the displayed images (340). For example, if a wearer views the resultant images, the user will view the original textual content. Without the one or more programs transforming the images, the user would not be able to view the original textual content because the cognitive issues of the user would affect the user's perception of the display. The one or more programs virtually display the resultant images to the wearer (350). In an embodiment of the present invention, the one or more programs utilize a projector in the OMHD device to display the transformed content.

Figure 4:
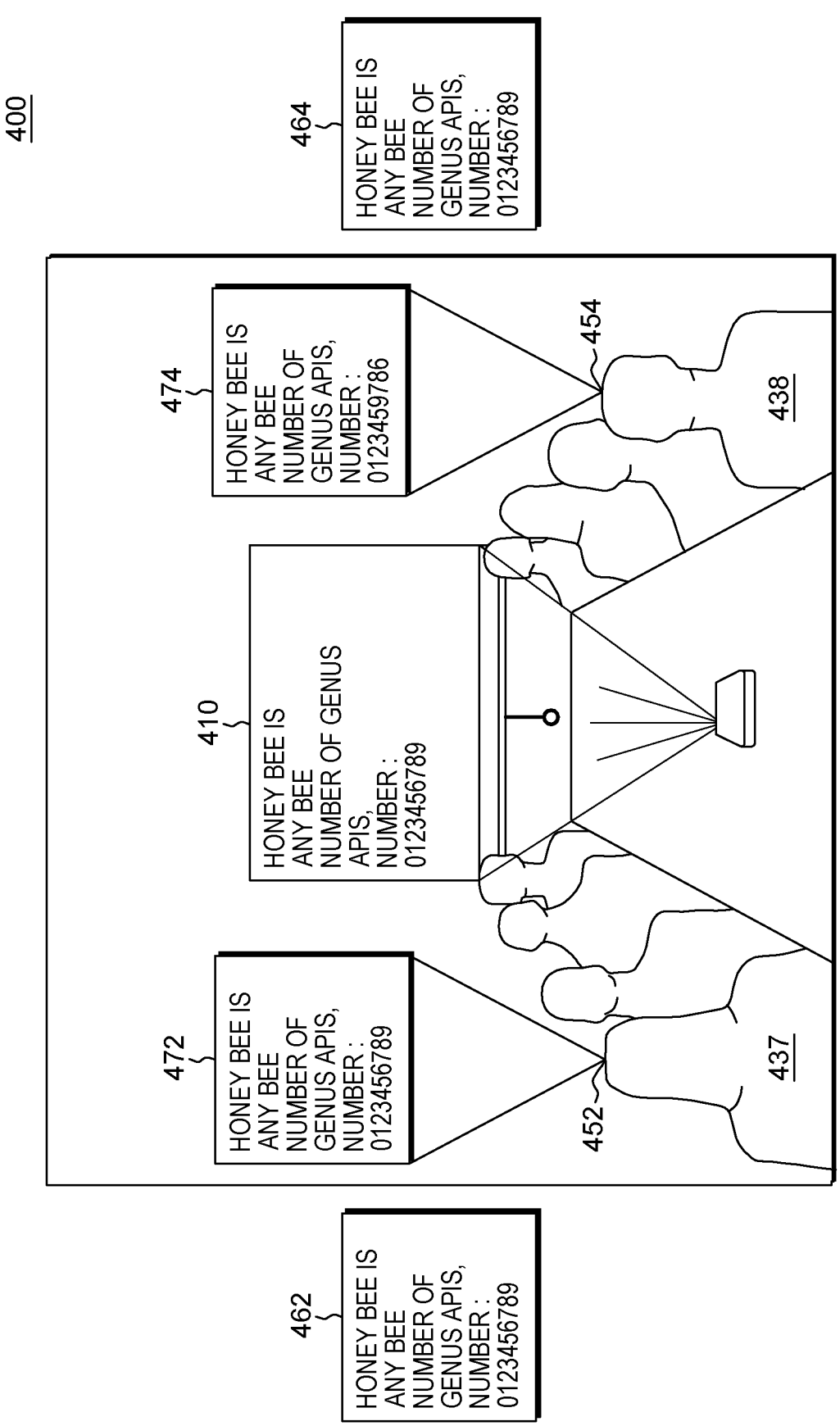
FIG. 4 is an illustration of various aspects of an environment in which aspects of embodiments of the present invention have been implemented.

FIG. 4 is an illustration of a meeting 400 in which two attendees 437 438 of the meeting are utilizing OMHD devices 452 454 (e.g., FIG. 2 apparatus 200) to view displayed content 410. One or more programs executed by processing units in the OMHD devices 452 454 display the displayed content 410 as transformed displays 472 474. Each transformed display includes text changes from the displayed content 410 that allow the wearer of each OMHD devices 452 454 to perceive the text in the displayed content 410 as being identical to the text of the displayed content 410. However, the in order to accommodate the cognitive issues experienced by the attendees 437 438, the one or more programs are utilizing a projectors in the OHMD devices 452 454 to project the text with differences from the original in the displayed content 410. The transformed displays 472 474 by the OHMD devices 452 454 include changes to the characters in the displayed content 410. However, the attendees 437 438 perceive the transformed displays 472 474 as the virtual displays 462 464.

Referring to FIG. 4, a first attendee 437 perceives the character "E" as "B" and vice versa. As illustrated in FIG. 3, one or more programs in an embodiment of the present invention obtains this information regarding this individuals' cognitive issues. Thus, to correctly read the displayed content 410, which includes the text "HONEY BEE IS ANY BEE NUMBER OF GENUS APIS NUMBER: 0123456789" the one or more programs of the OHMD device 452 worn by this first attendee 437 displays the text of the displayed content 410 as a first transformed display 472, which includes the text: "HONBY EBB IS ANY EBB NUMEBR OF GBNUS APIS NUMEBR: 0123456789." However, the first attendee 437 views the first transformed display 472 as the first virtual display 462, which includes the text: "HONEY BEE IS ANY BEE NUMBER OF GENUS APIS NUMBER: 0123456789."

A second attendee 438 perceives the character "M" as "W" and vice versa and the character "6" as "9" and vice versa. As illustrated in FIG. 3, one or more programs in an embodiment of the present invention obtains this information, for example, via a voice command. This information may be conveyed by utilizing a pre-defined level to characterize these issues. To enable the second attendee 438 to read the displayed content 410, which includes the text "HONEY BEE IS ANY BEE NUMBER OF GENUS APIS NUMBER: 0123456789" the one or more programs of the OHMD device 454 worn by this second attendee 438 displays the text of the displayed content 410 as a second transformed display 474, which includes the text: "HONEY BEE IS ANY BEE NUWBER OF GENUS APIS NUWBER: 0123459786." However, the second attendee 438 views the second transformed display 474 as the second virtual display 464, which includes the text: "HONEY BEE IS ANY BEE NUMBER OF GENUS APIS NUMBER: 0123456789."

Although FIG. 4 uses OMHD devices 452 454 as illustrative examples of computing devices that incorporate aspects of embodiments of the present invention, as understood by one of skill in the art, a computing device used to project new content, based on processed original content, to a user, may include various other computing devices. Some example of devices that can be utilized in embodiments of the present invention include, but are not limited to, a pen computer, a personal computing device, a smart device, an and Internet of Things device. In embodiments of the present invention, these devices obtain original content, process the content, and project at least a portion of the resultant processed content to a user.

Figure 5:
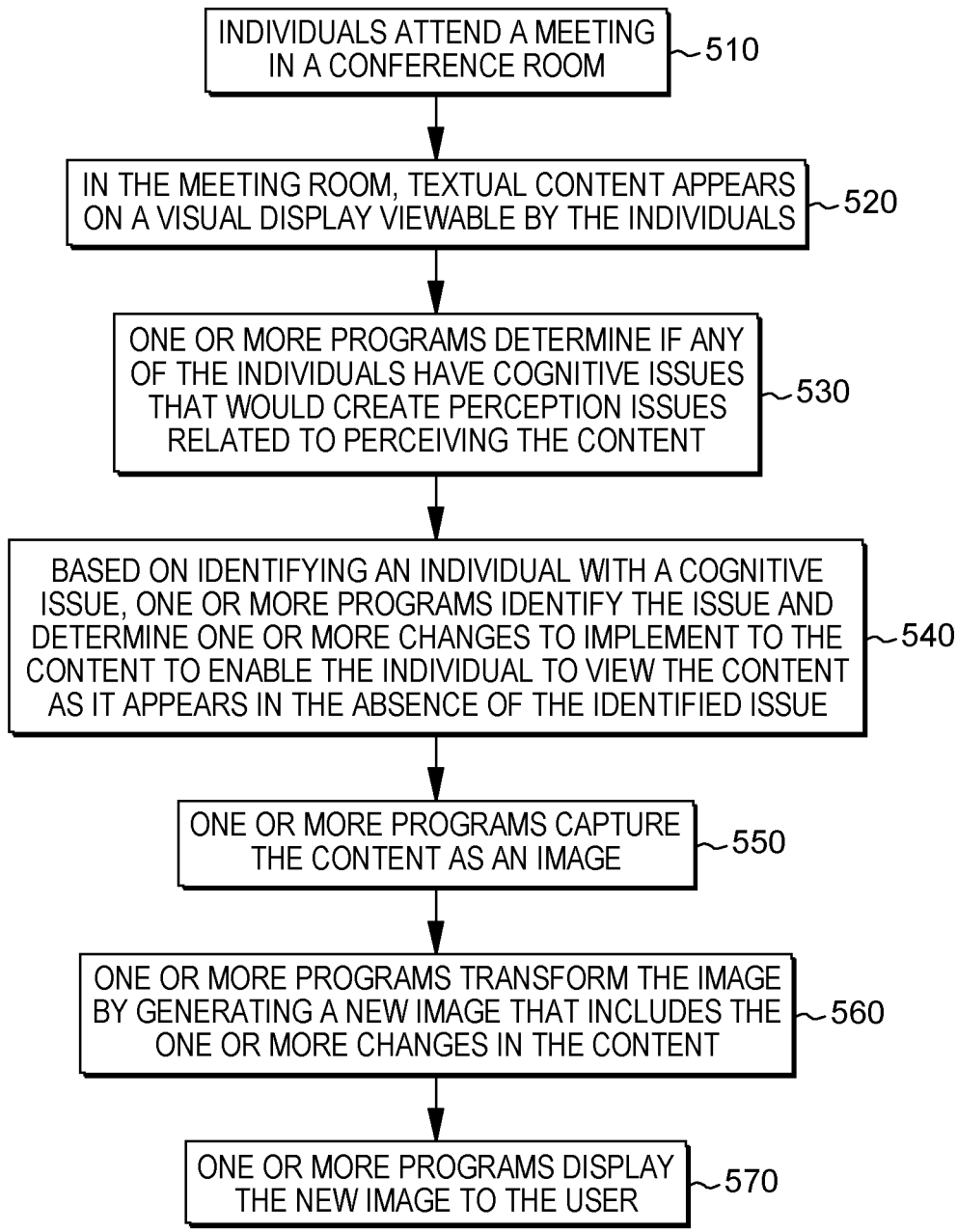
FIG. 5 is a workflow illustrating certain aspects of an embodiment of the present invention.

FIG. 5 is a workflow 500 that illustrates the functionality of certain embodiments of the present invention in a particular setting, in this example, in a group meeting. To illustrate how aspects of embodiments of the present invention fit into the framework of a group meeting and assist the individuals attending the meeting is accessing the content of visuals utilized during the meeting, certain of the aspects described relate to the behaviors of the individuals, while other aspects relate to aspects of embodiments of the present invention.

The workflow 500 of FIG. 5 commences with individuals attending a meeting in a conference room (510). During the presentation, textual content appears on a visual display, including but not limited to a screen and/or a monitor (520). The individuals in the conference room are able to see this visual display. One or more programs in an embodiment of the present invention determine if any individuals attending the meeting have cognitive issues that would create perception issues related to perceiving the content (530). Based on identifying an individual with a cognitive issue, the one or more programs identify the issue and determine one or more changes to implement to the content to enable the individual to view the content as it appears in the absence of the identified issue (540). The one or more programs capture the content as an image (550). The one or more programs transform the image by generating a new image that includes the one or more changes in the content (560). The one or more programs display the new image to the user (570).

As discussed earlier, the manner in which the one or more programs displays the new image to the user may vary. For example, the one or more programs may display the new image at a position in which it is visually overlaid on displayed image. The one or more programs may display the new image such that it appears to the individual as a virtual display. However, in embodiments of the present invention, the one or more programs display the new image to the individual in a manner that does not affect the perception of the original content by the remaining individuals in the meeting.

In embodiments of the present invention, the one or more programs capture, convert, and display, the image to an individual at a pace close to real-time. The capture, transformation, and re-display of textual content occurs quickly in part because embodiments of the present invention utilized pre-defined classifications to identify what changes should be made to an image before it is displayed.

Figure 6:
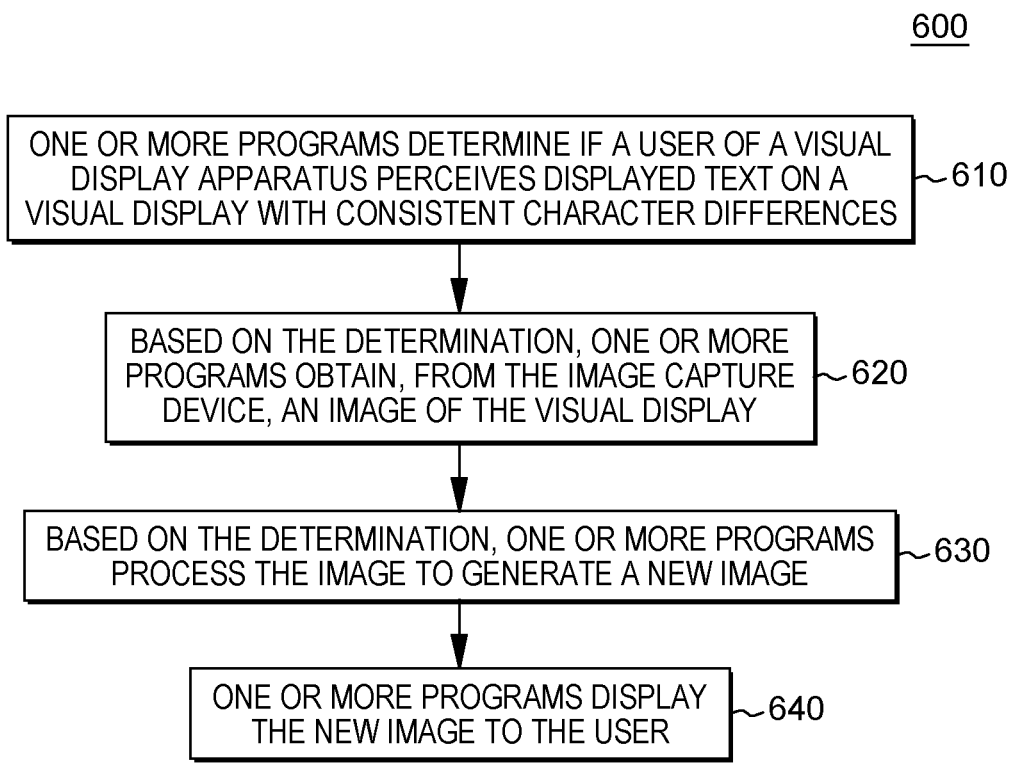
FIG. 6 is a workflow illustrating certain aspects of an embodiment of the present invention.

While embodiments of the present invention are useful in converting original content for re-projection and viewing by an individual with cognitive perception challenges, aspects of some embodiments of the present invention may also be utilized to assist a user without cognitive perception challenges read content that is generated by an individual with cognitive perception challenges. For example, an individual (with cognitive perception challenges) may prepare a presentation that=contains displayed text with consistent character errors. In this case, the user (without cognitive perception challenges) will perceive the text with consistent character differences from the displayed text, because the individual, who prepared the text, and the user, who is perceiving the text, each perceive characters differently. Thus, whether it is the display that contains character differences, such as consistently switching a first character for a second character, or consistently inverting one or more characters, or the user who perceives these differences, when viewing an original display, aspects of some embodiments of the present invention may assist both the individual and the user in perceiving substantially similar content. FIG. 6 is a workflow 600 of an embodiment of the present invention which is applicable in both scenarios.

Referring to FIG. 6, one or more programs in some embodiments of the present invention one or more programs determine if a user of a visual display apparatus (that includes an image capture device, and a projection device communicatively coupled to the one or more processors executing the one or more programs) perceives displayed text on a visual display with consistent character differences (610). The one or more programs makes this determination based either on obtaining data indicating that the user perceives displayed text with consistent character differences or by determining that text on the visual display include consistent character differences. As discussed above, the user could be perceiving the text differently than it appears in the display or the user could be perceiving the text, as displayed, but the text includes consistent character differences. Based on the determination, the one or more programs obtain, from the image capture device, an image of the visual display (which is within a visual range of the image capture device) (620). Based on the determination, the one or more programs process the image to generate a new image (630).

In some embodiments of the present invention, the one or more programs process the image by transforming the image into the new image; the new image includes textual elements with pre-defined character substitutions based on the consistent character differences. In the case where the user text in the visual display objectively contained consistent character differences, the new image would contain text that does not include these differences. For example, if an objective observer would have perceived the visual display as containing a character that was displayed at an orientation that differs from the remaining text, the new image would include the text, including the character, all with the same orientation. Alternatively, if the user of the visual display apparatus perceived the original visual display with consistent character differences, for example that were not present from the point-of-view of the creator of the visual, the new image would include textual elements with pre-defined character substitutions based on these consistent character differences.

Returning to FIG. 6, upon generating the new image, the one or more programs display (e.g., via the projection device), the new image, to the user, (640) where based on viewing the new image, the user views the textual elements without the consistent character differences (whether those difference were part of the original display or just present because of the cognitive issues of the user perceiving the original display). Depending on the type of device, the display could be projected onto a screen, projected within the line of sight of the user, and/or display on a screen on a computing device accessible (or part of) the visual display apparatus.

Embodiments of the present invention include a computer-implemented method, a computer program product, and a visual display apparatus where one or more programs executed by one or more processors obtains data indicating that a user of a/the visual display apparatus (which includes an image capture device and a projection device communicatively coupled to the one or more processors) perceives displayed text with consistent character differences. The one or more programs obtain, from the image capture device, an image of the visual display within a visual range of the image capture device wherein the image comprises textual elements. Based on the data, the one or more programs process the image to generate a new image; the processing includes transforming the image into the new image where the new image includes the textual elements with pre-defined character substitutions, based on the consistent character differences. The one or more programs display, via the projection device, the new image, to the user. Based on viewing the new image, the user views the textual elements without the consistent character differences.

In some embodiments of the present invention, the visual display apparatus also include an input to receive vocal commands and the one or more programs obtain the data via a voice command received by the input. In some embodiments of the present invention that include the input to receive vocal commands, the one or more programs obtain the data via a memory resource accessible to the one or more processors, based on obtaining an identifier of the user via a voice command received by the input.

In some embodiments of the present invention, the consistent character differences are either the vertical transformation characters, the horizontal transformation of characters, and/or a visual similarity of input characters. In some embodiments of the present invention, the consistent character differences include consistently switching a first character for a second character. The one or more programs may transform the image into a new image by identifying instances of the first character in the image and substituting instances of the second character for the instances of the first character in the new image. In some embodiments of the present invention, the consistent character differences include consistently reversing the orientation of a first character. The one or more programs may transform the image into a new image by identifying instances of the first character in the image and reversing the orientation of the first character for the instances of the first character in the new image.

In some embodiments of the present invention, the one or more programs display the new image by virtually projecting the new image on the visual display, where the new image is visible to the user of the visual display apparatus. The one or more programs may also display the image by projecting the new image on a display communicatively coupled to the visual display apparatus.

In some embodiments of the present invention, the one or more programs determine that the visual display includes a second image that differs from the image. The one or more programs obtain, from the image capture device, the second image of the visual display, where the second image comprises textual elements. Based on the data indicating that a user of the visual display apparatus perceives displayed text with consistent character differences, the one or more programs process the second image to generate another new image. The processing may include transforming the second image into the other new image, where the other new image includes the textual elements of the second image with the pre-defined character substitutions based on the consistent character differences. The one or more programs display, via the projection device, the other new image, to the user, where based on viewing the other new image, the user views the textual elements of the second image without the consistent character differences.

In some embodiments of the present invention, the one or more programs obtain and display the image in real time.

In some embodiments of the present invention, the visual display apparatus is a wearable apparatus that is worn by the user. In some embodiments of the present invention, the visual display apparatus is one or more of an optical head mounted display, a pen computer, and a smart device.

In some embodiments of the present invention, the one or more programs obtaining the data indicating that the user perceives displayed text with consistent character differences includes the one or more programs identifying the user. The one or more programs access, from a memory communicatively coupled to the one or more processors, the data indicating that the user perceives displayed text with consistent character differences. In some embodiments of the present invention, the one or more programs identify the user by utilizing a recognition technique selected from the group consisting of: facial recognition, obtaining user account information, obtaining a username utilized by the user to access the visual display apparatus, obtaining the username utilized by the user to access a computing module communicatively coupled to the visual display apparatus.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the CPU 210 (FIG. 2) or a resource that the program code executing on the CPU 210 communicates with to obtain information about a user of the apparatus 200 (FIG. 2) can be understood as a cloud computing node 10 (FIG. 7) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
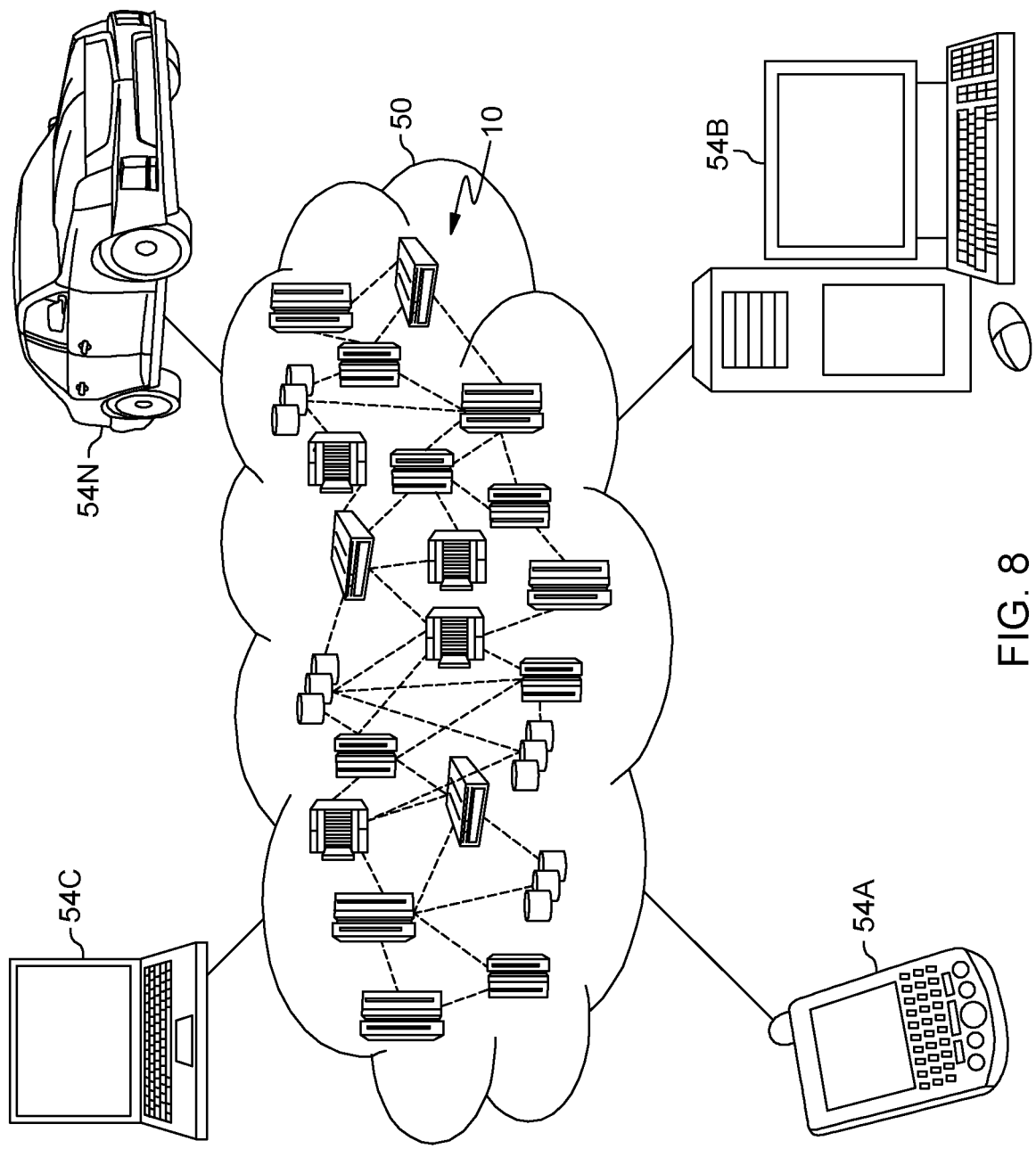
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
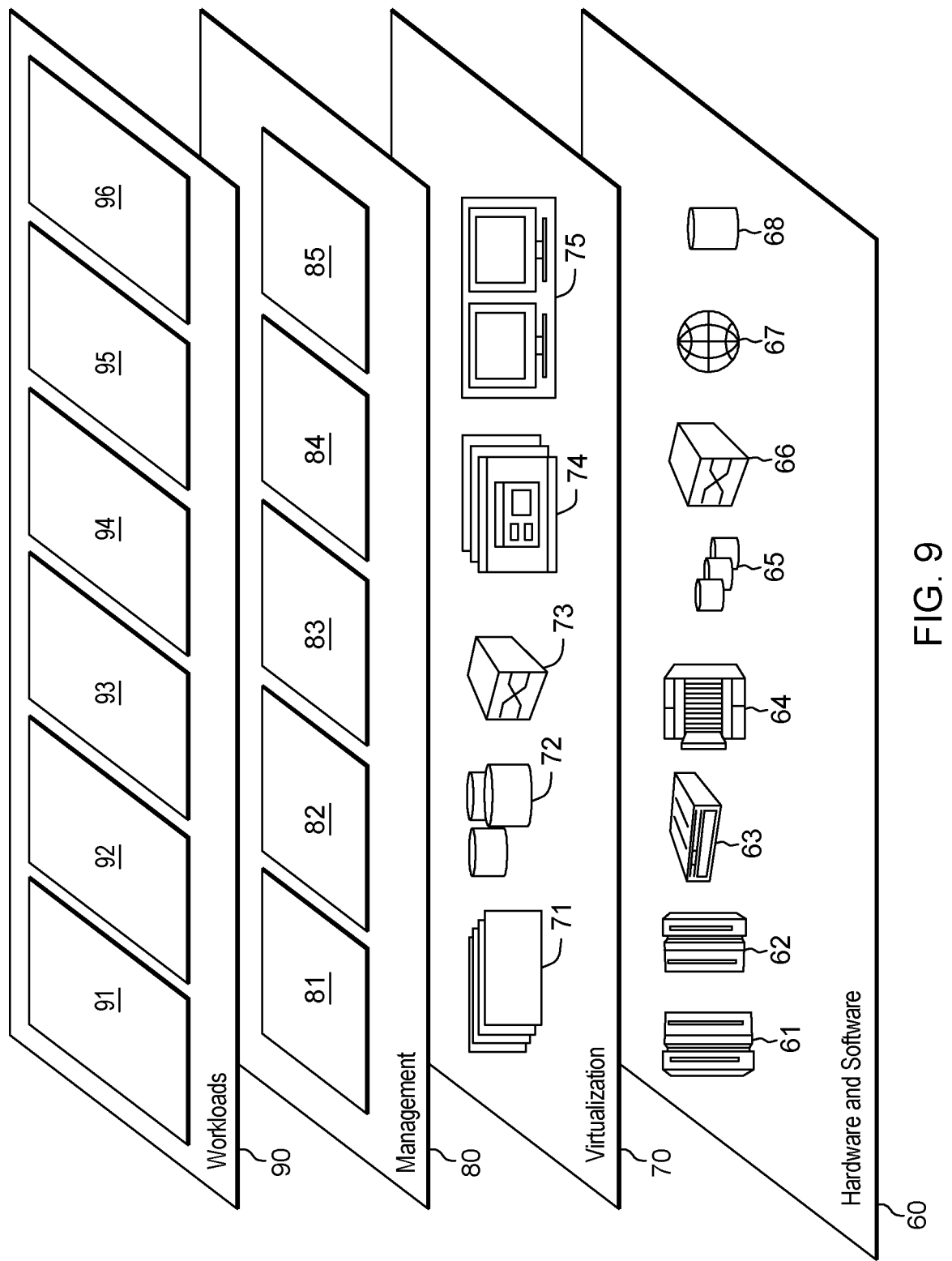
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing images for display 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
a computer readable storage medium readable by one or more processors and storing instructions for execution by the one or more processors for performing a method comprising:
displaying, by the one or more processors, on a visual display, an image comprising textual elements, wherein the displaying comprises placing the image on a given portion of physical real estate of the visual display, and wherein the textual elements comprise substantive content, wherein the visual display apparatus comprises an input to receive vocal commands;
obtaining, by the one or more processors, data indicating that a first user of a visual display apparatus comprising an image capture device, and a projection device, communicatively coupled to the one or more processors, perceives displayed text with consistent character differences, such that the textual elements, as perceived by the first user on the visual display are visually different from the textual elements, as perceived by a second user on the visual display, wherein the second user does not perceive the textual elements on the visual display with the consistent character differences, wherein obtaining the data comprises obtaining the data, via a voice command received by the input, and wherein the voice command comprises a vocal identification by the user of one or more cognitive issues by selecting a pre-defined level identifier comprising the consistent character differences;
obtaining, by the one or more processors, from the image capture device, a digital image of the image displayed on the visual display, wherein the visual display is within a visual range of the image capture device, wherein the digital image comprises the textual elements of the image;
based on the data, processing, by the one or more processors, the digital image to generate a new image, wherein the processing comprises transforming the digital image into the new image wherein the new image comprises the textual elements with pre-defined character substitutions based on the consistent character differences; and
virtually displaying, by the one or more processors, via the projection device, on the visual display, the new image to the first user, wherein based on viewing the new image via the visual display apparatus, the first user views the textual elements without the consistent character differences, wherein simultaneously with the virtually displaying, the visual display is displaying the image to the second user, wherein based on utilizing the visual display apparatus to view the visual display, the first user views the new image on the given portion of the physical real estate of the visual display contemporaneously with the second user viewing the image on the given portion of the physical real estate of the visual display, and wherein based on the first user viewing the new image and the second user viewing the image, the first user and the second user view the substantive content.

2. The computer program product of claim 1, wherein the consistent character differences comprise consistently switching a first character for a second character and transforming the image into a new image comprises identifying instances of the first character in the image and substituting instances of the second character for the instances of the first character in the new image.

3. The computer program product of claim 1, wherein the consistent character differences comprise consistently reversing the orientation of a first character and transforming the image into a new image comprises identifying instances of the first character in the image and reversing the orientation of the first character for the instances of the first character in the new image.

4. The computer program product of claim 1, the displaying comprises virtually projecting the new image on the visual display, wherein the new image is visible to the first user when wearing the visual display apparatus.

5. The computer program product of claim 1, wherein the consistent character differences are selected from the group consisting of: vertical transformation characters, horizontal transformation of characters, and a visual similarity of input characters.

6. A visual display apparatus comprising:
a memory;
one or more processors in communication with the memory;
an image capture device communicatively coupled to the one or more processors;
a projection device communicatively coupled to the one or more processors configured to virtually display on a visual display within image capture range of the image capture device, the virtual display viewable by a first user wearing the visual display apparatus; and
program instructions executable by the one or more processors via the memory to perform a method, the method comprising:
displaying, by the one or more processors, on the visual display, an image comprising textual elements, wherein the displaying comprises placing the image on a given portion of physical real estate of the visual display, and wherein the textual elements comprise substantive content, wherein the visual display apparatus comprises an input to receive vocal commands;
obtaining, by the one or more processors, data indicating that the first user wearing the visual display apparatus perceives displayed text with consistent character differences, such that the textual elements, as perceived by the first user, on the visual display, are visually different from the textual elements, as perceived by a second user, on the visual display, wherein the second user does not perceive the textual elements on the visual display with the consistent character differences, wherein obtaining the data comprises obtaining the data, via a voice command received by the input, and wherein the voice command comprises a vocal identification by the user of one or more cognitive issues by selecting a pre-defined level identifier comprising the consistent character differences;
obtaining, by the one or more processors, from the image capture device, a digital image of the image displayed on the visual display, wherein the visual display is within a visual range of the image capture device, wherein the digital image comprises the textual elements of the image;
based on the data, processing, by the one or more processors, the digital image to generate a new image, wherein the processing comprises transforming the digital image into the new image wherein the new image comprises the textual elements with pre-defined character substitutions based on the consistent character differences; and virtually displaying, by the one or more processors, via the projection device, on the visual display, the new image to the first user, wherein based on viewing the new image via the visual display apparatus, the first user views the textual elements without the consistent character differences, wherein simultaneously with the virtually displaying, the visual display is displaying the image to the second user, wherein based on utilizing the visual display apparatus to view the visual display, the first user views the new image on the given portion of the physical real estate of the visual display contemporaneously with the second user viewing the image on the given portion of the physical real estate of the visual display, and wherein based on the first user viewing the new image and the second user viewing the image, the first user and the second user view the substantive content.

7. The visual display apparatus of claim 6, wherein the consistent character differences comprise consistently switching a first character for a second character and transforming the image into a new image comprises identifying instances of the first character in the image and substituting instances of the second character for the instances of the first character in the new image.

8. The visual display apparatus of claim 6, wherein the consistent character differences comprise consistently reversing the orientation of a first character and transforming the image into a new image comprises identifying instances of the first character in the image and reversing the orientation of the first character for the instances of the first character in the new image.

9. The visual display apparatus of claim 6, the displaying comprises virtually projecting the new image on the visual display, wherein the new image is visible to the first user when wearing the visual display apparatus.

10. The visual display apparatus of claim 6, wherein the consistent character differences are selected from the group consisting of: vertical transformation characters, horizontal transformation of characters, and a visual similarity of input characters.

* * * * *